United States Patent [19]
Caron et al.

[11] Patent Number: 4,718,528
[45] Date of Patent: Jan. 12, 1988

[54] TRACTION-TYPE CLUTCH BEARING DEVICE

[75] Inventors: Fabrice Caron, Montigny le Bretonneux; Eric Loizeau, Clamart, both of France

[73] Assignee: SKF Compagnie d'Applications Mecaniques, Clamart, France

[21] Appl. No.: 822,495

[22] Filed: Jan. 27, 1986

[30] Foreign Application Priority Data

Jan. 28, 1985 [FR] France ................... 8501138

[51] Int. Cl.⁴ .............................. F16D 23/14
[52] U.S. Cl. ................. 192/98; 192/110 B; 192/995
[58] Field of Search ............ 192/98, 110 B, 995

[56] References Cited

U.S. PATENT DOCUMENTS

| | | | |
|---|---|---|---|
| 4,399,898 | 8/1983 | Olschewski et al. | 192/98 |
| 4,588,061 | 5/1986 | Mallet | 192/110 B |

FOREIGN PATENT DOCUMENTS

| | | | |
|---|---|---|---|
| 153087 | 8/1985 | European Pat. Off. | |
| 2613952 | 10/1977 | Fed. Rep. of Germany | |
| 2639766 | 3/1978 | Fed. Rep. of Germany | |
| 3113463 | 12/1982 | Fed. Rep. of Germany | |
| 3150150 | 6/1983 | Fed. Rep. of Germany | |
| 55063 | 6/1951 | France | |
| 2012657 | 10/1971 | France | |
| 2296118 | 7/1976 | France | 10001976/FRX |
| 2385934 | 10/1978 | France | |
| 2427506 | 12/1979 | France | |
| 2468787 | 5/1981 | France | |
| 2518678 | 6/1983 | France | |
| 2538060 | 6/1984 | France | |
| 2540585 | 8/1984 | France | |
| 2544035 | 10/1984 | France | |
| 2544036 | 10/1984 | France | |
| 2544037 | 10/1984 | France | |
| 2544039 | 10/1984 | France | |
| 2545172 | 11/1984 | France | |
| 1478920 | 7/1977 | United Kingdom | |

Primary Examiner—William F. Pate, III
Assistant Examiner—Caroline D. Dennison
Attorney, Agent, or Firm—Beveridge, DeGrandi & Weilacher

[57] ABSTRACT

A traction-type clutch bearing device includes an engaging piece (1) maintained in permanent contact with the clutch diaphragm (13) by an elastic member (14), a thrust bearing (2) which can move axially relative to a guide tube (10) under the action of a control member (11), and an axial connecting device interacting with a retaining groove made either in the engaging piece or in a member of the thrust bearing to connect and/or disconnect the thrust bearing and the engaging piece. The connecting device includes a ball cage (3) and a plurality of balls (23) mounted between the engaging piece (1) and the thrust bearing (2) and which are capable, in the connection position, of interacting with a wedging zone (25) and the a retaining groove (24), to ensure axial locking, and, during removal, with a release zone (30). The wedging zone (25) and the release zone (30) are located either on an inner raceway (6) of the thrust bearing (2) or on the engaging piece (1).

20 Claims, 25 Drawing Figures

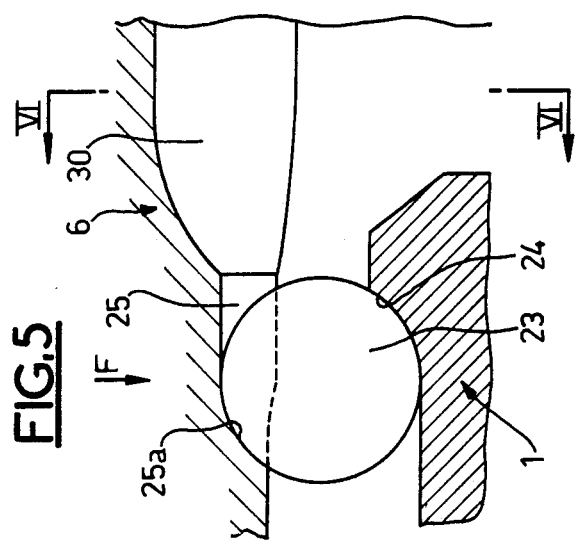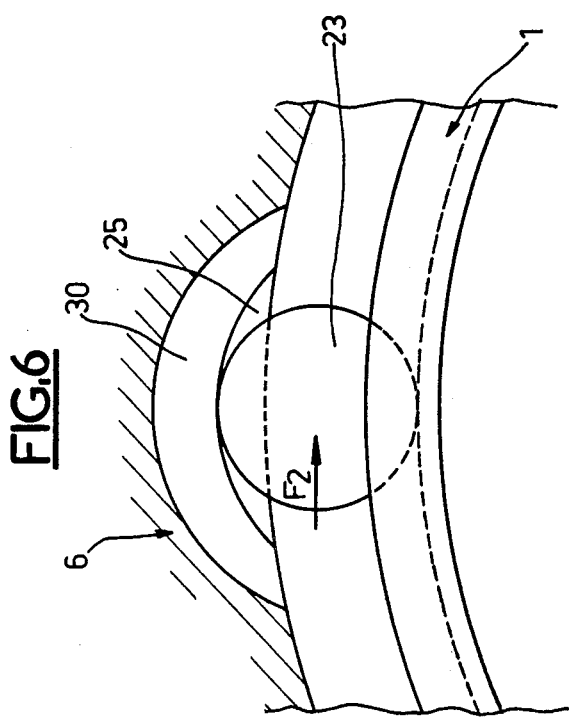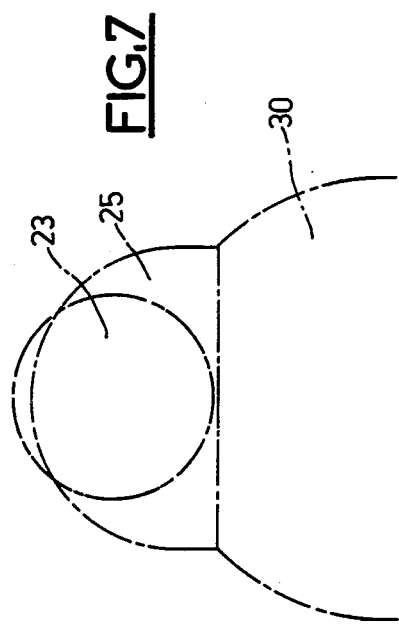

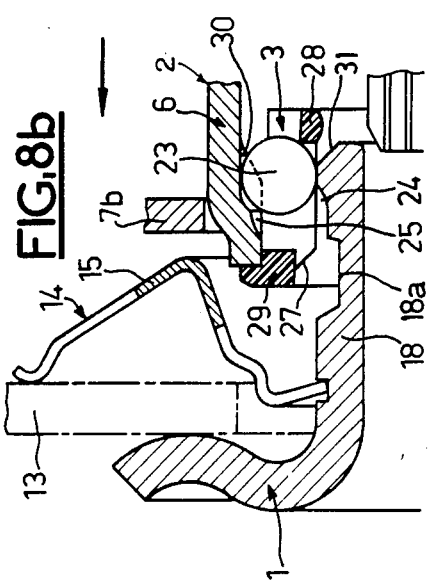
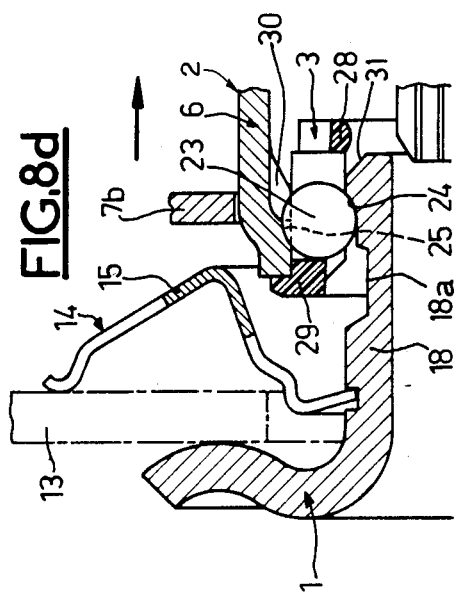
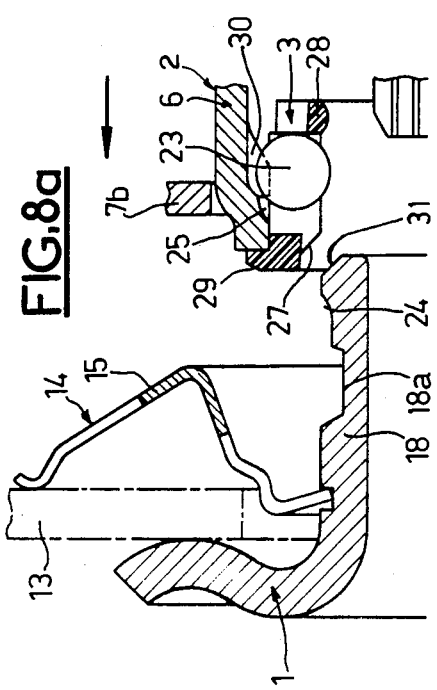
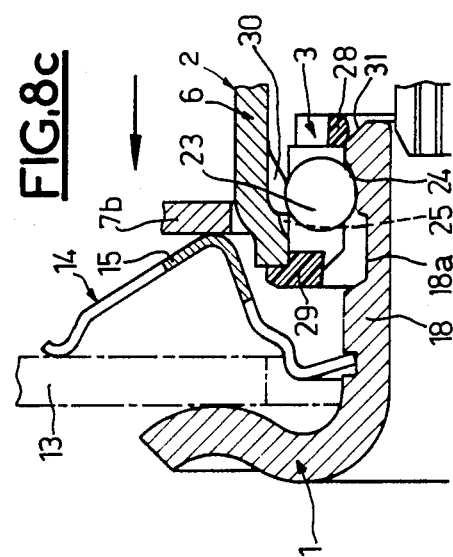

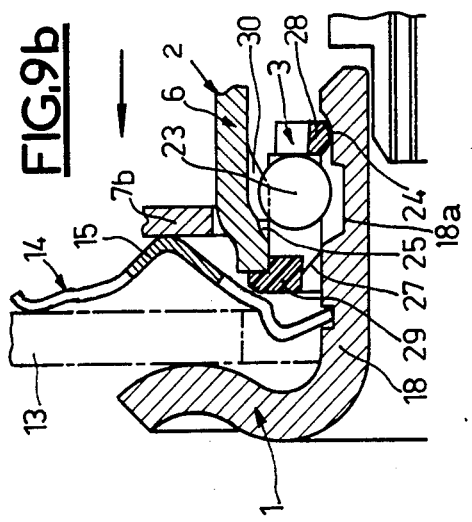
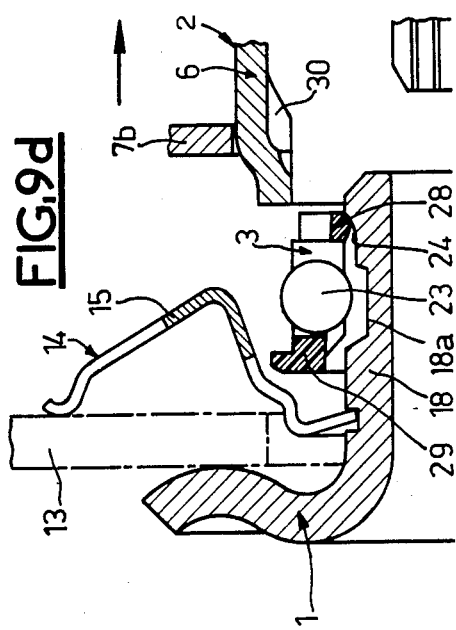
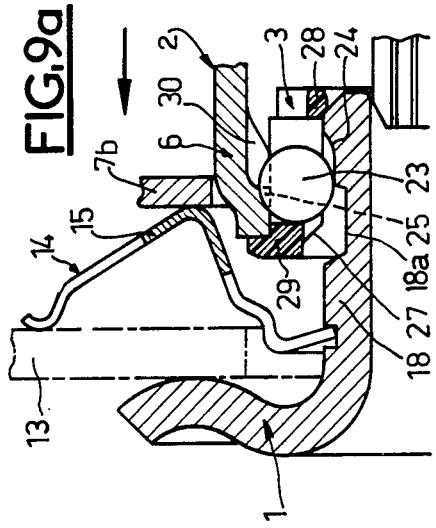
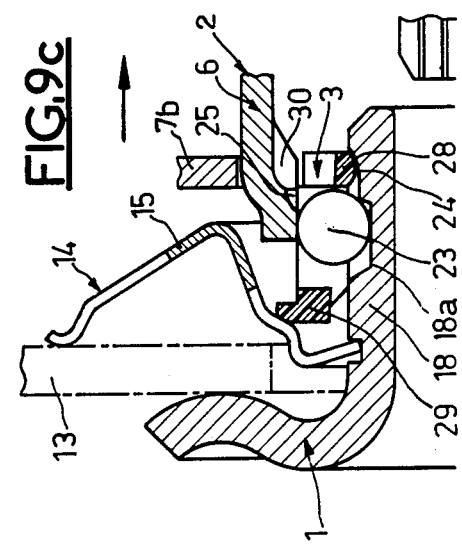

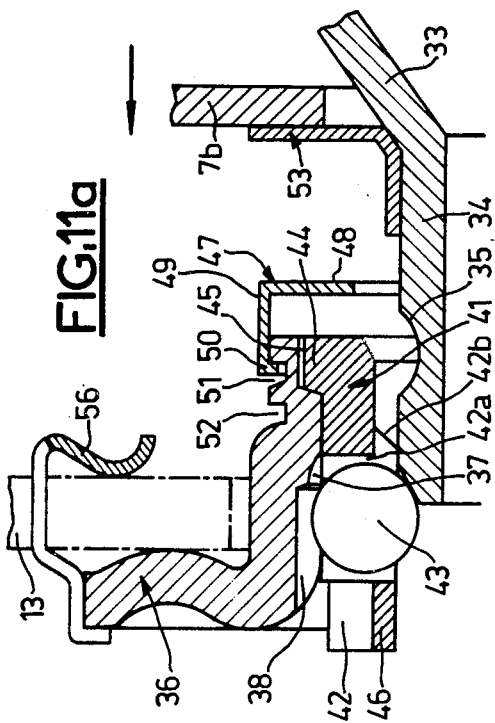
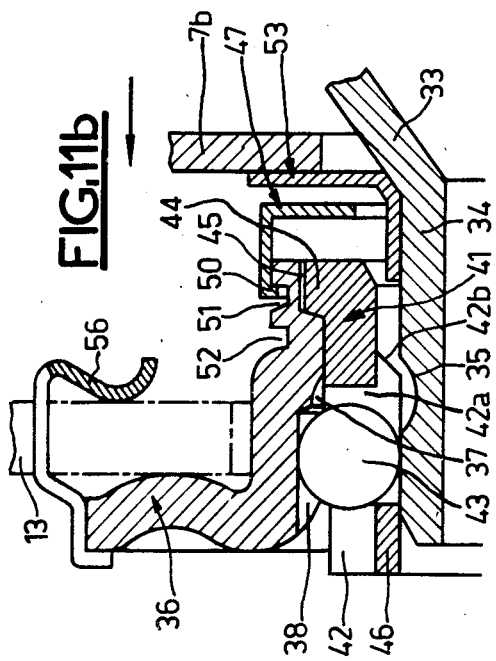
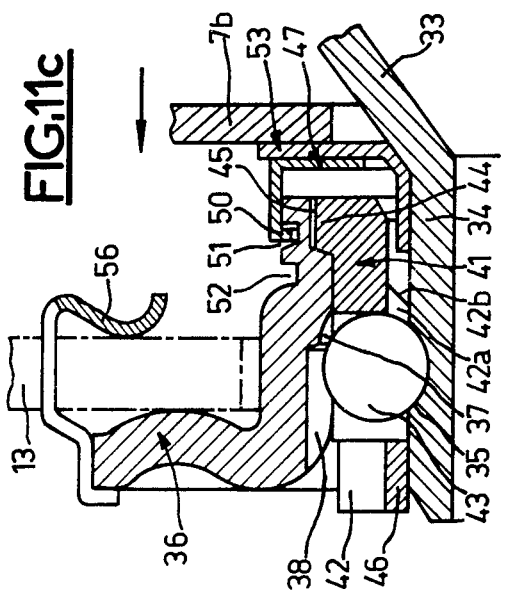
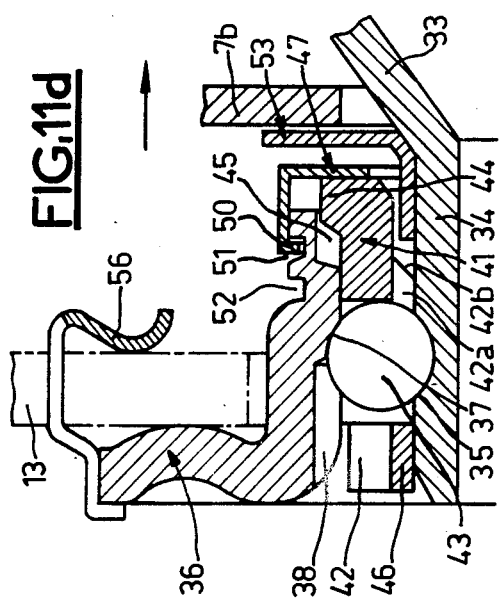

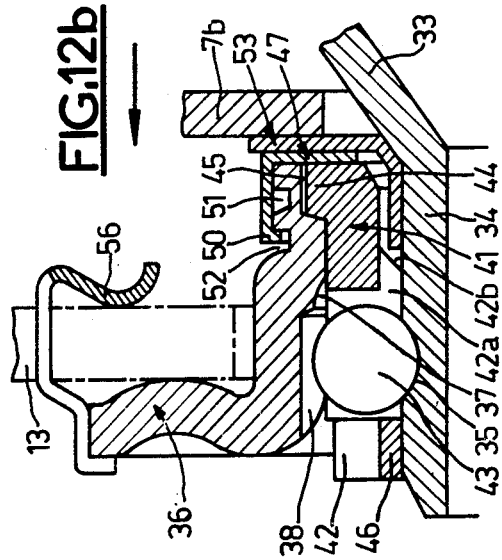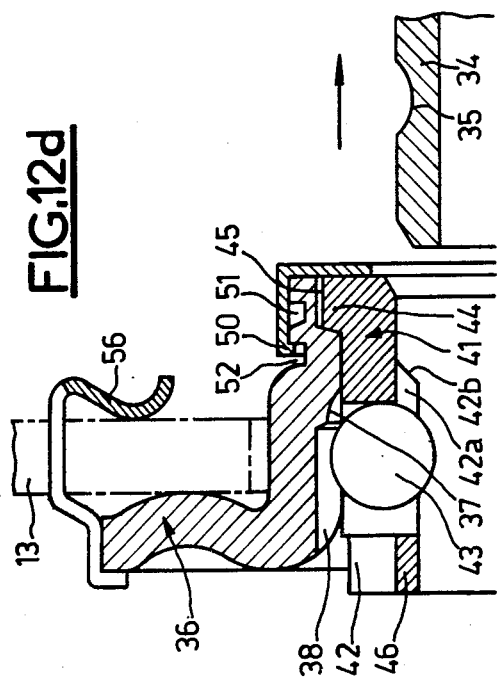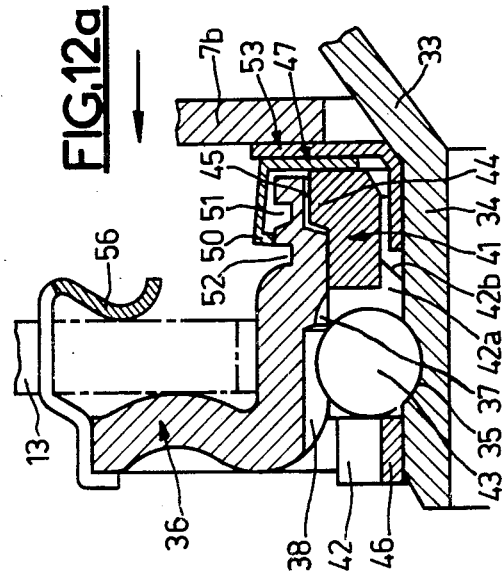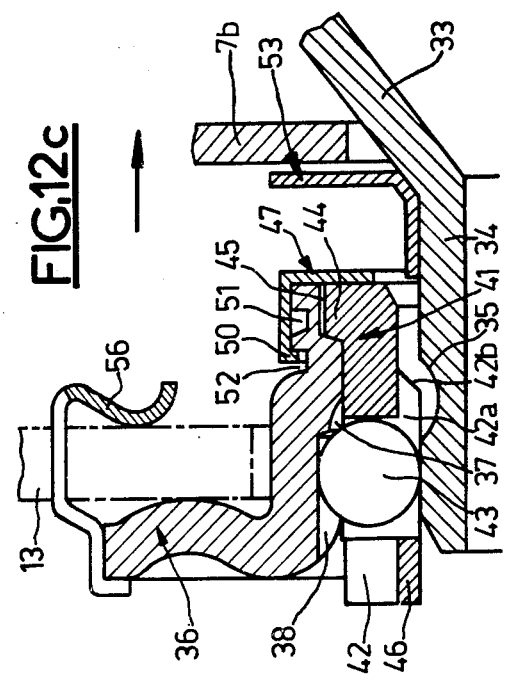

TRACTION-TYPE CLUTCH BEARING DEVICE

The present invention relates to a traction-type clutch bearing device, particularly for a motor vehicle. This type of bearing works by traction and in permanent contact and with the rear face of the diaphragm of the release device by means of an annular piece called an engaging piece. Outside the periods of actuation of the clutch device, the permanent contact is ensured by means of a slight axial prestress.

French patent application No. 2,545,172 makes known a clutch bearing device of this type, possessing a retaining ring engaged in a groove made either in the engaging piece or in the rotating inner raceway of the thrust bearing. The thrust bearing is mounted on the release mechanism simply by snapping in the retaining ring. It is removed by exerting a push on the thrust bearing, thus causing the retaining ring to retract after passing over studs integral with the engaging piece. A comparable device is also found in the German Patent Application published under No. 3,113,463.

However, these prior devices have a certain number of disadvantages. In fact, the axial force needed to expand the retaining ring over the slopes provided for this purpose is relatively high and difficult to control. This results in a risk of being detached irreversibly in the event of an inopportune action in the axial direction. Moreover, in some phases of the actuation of the retaining ring, it comes up against sharp edge, and this is very hazardous for the operating safety of the device because of the risk that the retaining ring will be jammed between these edges and the other contact surfaces.

In these devices of the prior art, there is also a provision for preventing involuntary removal either by means of attached wedges (French patent application No. 2,545,172) or by means of a sleeve system or slide system (German patent application No. 3,113,463). As a result of this, it is impossible to carry out removal without prior access to the clutch bearing device itself, in order to make these means inoperative before removal. It is therefore impossible to carry out direct removal "blind", without an intermediate operation.

The subject of the present invention is a traction-type clutch bearing device which makes it possible to connect or disconnect the clutch bearing and the engaging piece linked to the diaphragm, simply by actuating the thrust bearing axially by means of its control member, and the fitting and removal operations can be carried out "blind", the thrust bearing remaining enclosed in a housing, all this being achieved without any tool, without the risk of incorrect actions and without the need for prior removal of the diaphragm or of any other element.

The traction-type clutch bearing device according to the invention comprises an engaging piece maintained in permanent contact with the clutch diaphragm by elastic means, a thrust bearing which can slide axially on a guide tube under the action of a control member, and axial connection means interacting with a retaining groove made either in the engaging piece or in a member of the thurst bearing and making it possible to connect the thrust bearing and the engaging piece to one another by means of snapping-in, whilst at the same time allowing removal by moving aside. According to the invention, the connection means comprise a ball cage having a plurality of balls mounted between the engaging piece and the thrust bearing and capable, in the connected position, of interacting with a wedging zone and the said retaining groove, thus ensuring axial and rotary locking. During removal, the balls of the ball cage are capable of interacting with a release zone. The wedging and release zones are made either on the abovementioned member of the thrust bearing or on the engaging piece.

The ball cage, which can advantageously be made of plastic, has a certain elasticity. It is provided with a plurality of receptacles for the balls, each receptacle preferably having axial dimensions greater than the diameter of the balls. In this way, the balls can move axially relative to the ball cage during the fitting and removal operations.

Each receptacle of the ball cage has two elastic retaining lugs for the corresponding ball, these tending to position the ball in such a way that the original diameter of the balls as a whole corresponds to the connected position, that is to say to the operating position of the clutch bearing device.

Means of blocking the ball cage axially during removal are also provided, the balls then interacting with the abovementioned release zone.

The ball cage also preferably has a chamfered peripheral zone making it possible to precentre the ball cage during fitting.

Each wedging zone for the balls consists of a first cell preferably obtained by machining without removal of chips and having, on a radial plane, a radius of curvature greater than that of the balls of the ball cage, to ensure the desired wedging and connection. In turn, each release zone consists of a second cell again preferably obtained by machining without the removal of chips and opening into the first cell. The second cell has a cavity greater than that of the first cell, thus making it possible to produce the release zone for the balls.

Elastic axial-stop means are also provided to limit temporarily the relative axial movement of the thrust bearing and the engaging piece during assembly, producing a hard point to allow the balls of the ball cage to ensure effective connection after snapping-in.

According to a first preferred embodiment of the clutch bearing device of the invention, the wedging and release zones are made on the inner periphery of part of the inner raceway of the thrust bearing. The retaining groove is made on the outer periphery of the engaging piece. The outer periphery of the engaging piece also has a release groove for moving aside the balls during the removal operation. ation.

In this embodiment, the ball cage has one or more peripheral beads performing the function of axial blocking of the cage in interaction with the retaining groove of the engaging piece during the removal operation. The ball cage also advantageously has an axial bearing rim interacting with the end of the inner raceway of the thrust bearing.

In a second embodiment, on the contrary, the wedging and release zones are made on the inner periphery of the engaging piece, and in this case the retaining groove is made on the outer periphery of part of the inner raceway of the thrust bearing.

In this embodiment, the ball cage simply has an axial bearing rim interacting with the end of the engaging piece.

In this embodiment again, there is a piece intended for the axial blocking of the ball cage and fastened to the end of the engaging piece. This locking piece can occupy two axial positions. In a first position, the ball cage can move up to its connected position. In a second position, the balls of the ball cage can interact with their release zone. The piece for the axial locking of the ball cage is advantageously fastened to the engaging piece by being snapped in elastically and can pass from the first position to the second position as a result of a simple axial push of the thrust bearing.

In a preferred embodiment, the piece for the axial locking of the ball cage is an integral part of the elastic means of retaining the engaging piece, which comprise a curved washer provided with a plurality of lugs constituting the said axial locking piece.

The subject of the present invention is also a thrust-bearing/ball-cage assembly or engaging-piece/ball-cage assembly which, after being fitted on a matching piece, makes it possible to produce a clutch bearing device.

Another subject of the present invention is a process for fitting and removing a clutch bearing device "blind".

The invention will now be described in more detail on the basis of two particular embodiments taken as non-limiting examples illustrated in the attached drawings in which:

FIG. 5 is an enlarged partial sectional view which shows diagrammatically one of the balls of the ball cage and the form of the cells;

FIG. 6 is a sectional view along the line VI—VI of FIG. 5;

FIG. 7 is a plan view according to the arrow F of FIG. 5, also showing the form of the cells;

FIGS. 8a to 8d are partial sectional views which illustrate diagrammatically the fitting operations during the installation of the clutch bearing device illustrated in FIG. 1;

Figure 1:
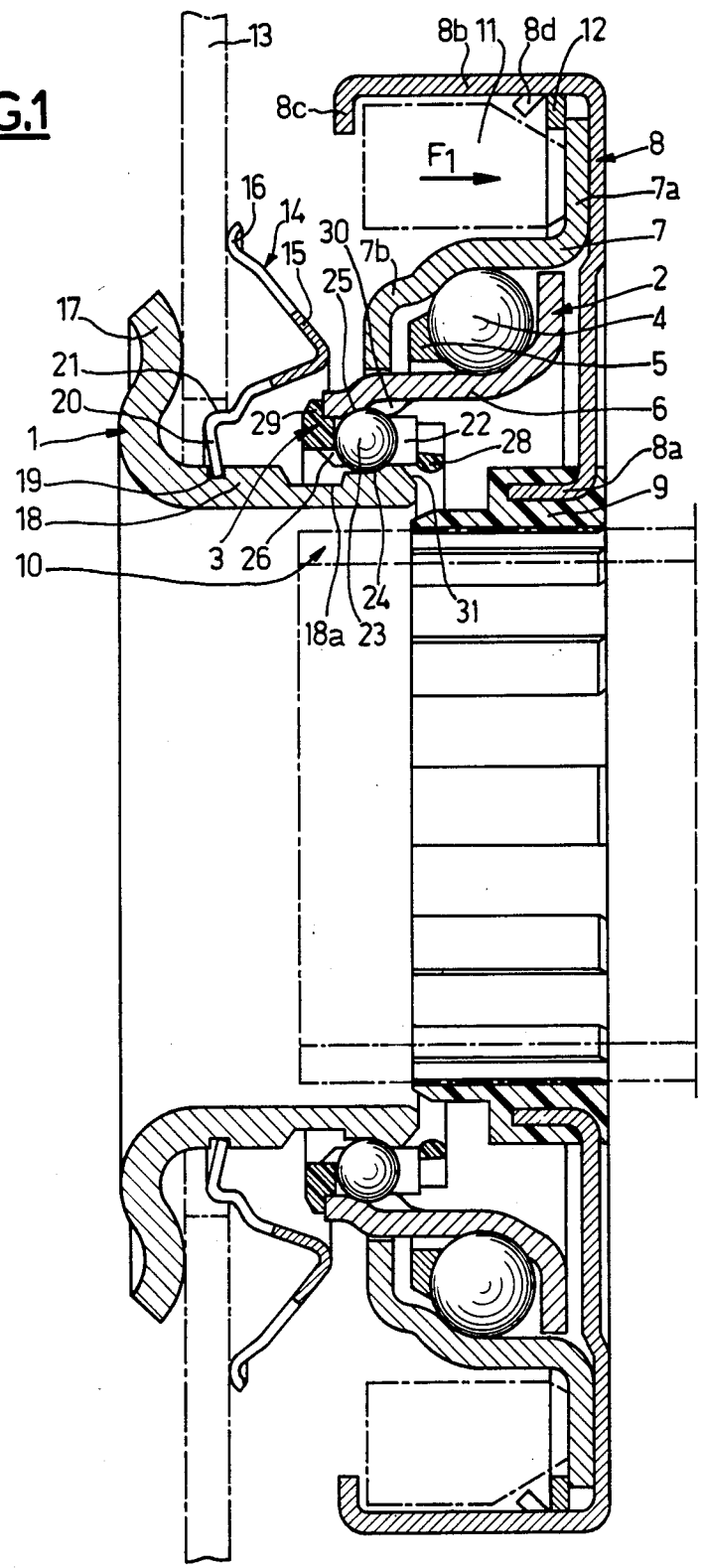
FIG. 1 is a sectional view of a first embodiment of a clutch device according to the invention.
Figure 10:
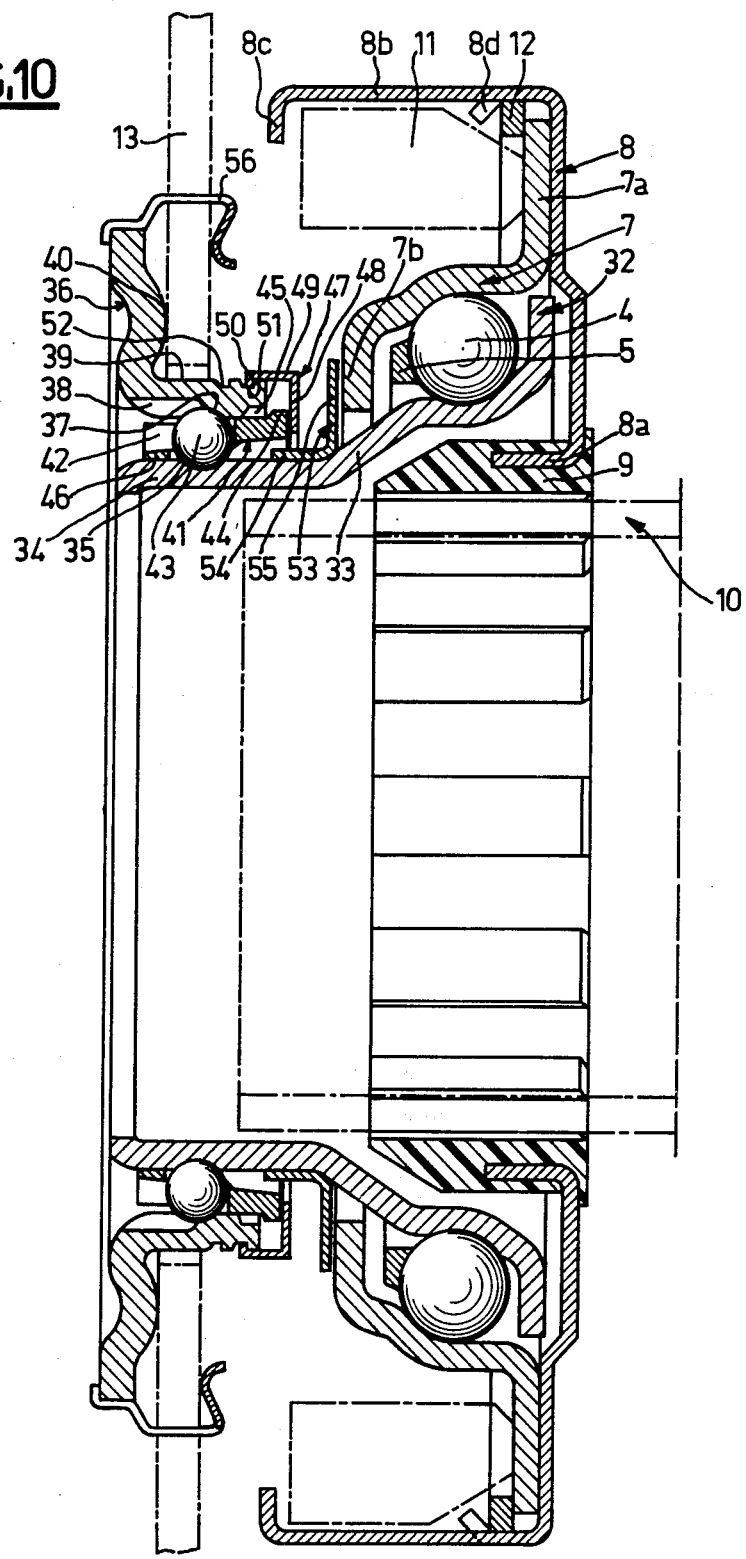
Figure 13:
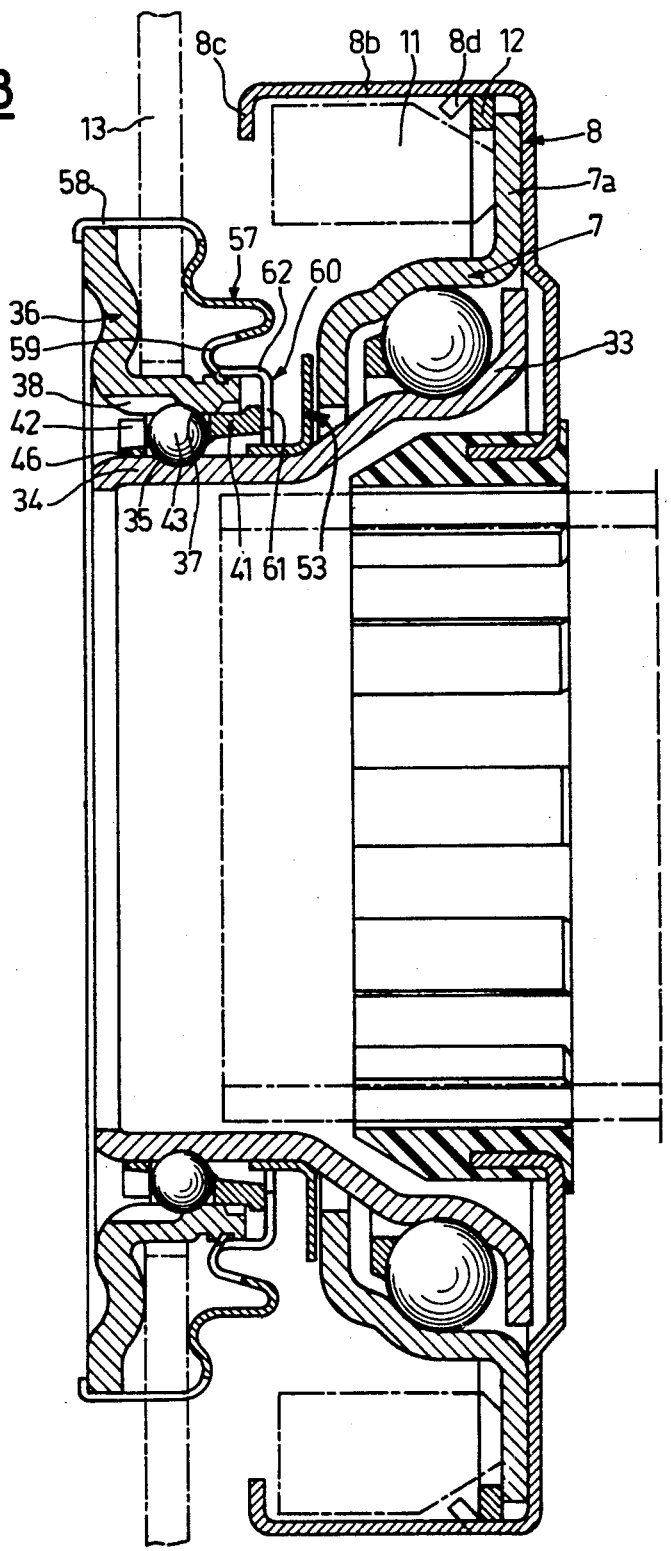

FIGS. to 9a to 9d are diagrammatic sectional views showing the different positions during the removal of the clutch bearing device illustrated in FIG. 1;

FIG. 10 is a sectional view of a second embodiment of a clutch bearing device according to the invention;

FIGS. 11a to 11d illustrate diagrammatically the different positions during the installation of a clutch device such as that illustrated in FIG. 10;

FIGS. 12a to 12d illustrate in the same way the different positions during the removal of such a clutch bearing device; and FIG. 13 is a sectional view of a third embodiment of a clutch bearing device according to the invention.

As illustrated in FIG. 1, the clutch device according to the invention comprises an engaging piece 1, a thrust bearing 2 and a ball cage 3 located between the engaging piece 1 and the thrust bearing 2.

The thrust bearing 2 comprises, in a conventional way, a plurality of balls 4 retained by a cage 5 and capable of rolling on the respective rolling tracks of a rotating inner raceway 6 and a fixed outer raceway 7 which are produced here by stamping.

The outer raceway 7 has a radial collar 7a in frictional contact with a connection piece 8 which is made integral by means of its end 8a with a guide sleeve 9 surrounding a guide tube 10. The connection piece 8 also has two diametrically opposed brackets 8b. The control member of the clutch bearing, shown diagrammatically at 11, is inserted between the annular part 7a of the outer raceway 7 and the bends 8c of the brackets 8b.

The frictional contact against the annular part 7a and the retaining piece 8 is ensured by means of an elastic ring 12 and a bent lug 8d integral with the retaining piece 8. A certain radial movement of the thrust bearing 2 is allowed, thus permitting self-centring of the latter in the usual way.

In this embodiment of a clutch bearing, there is a permanent axial prestress in the direction of the arrow $F_1$ in FIG. 1 between the thrust bearing 2 and the engaging piece 1. This prestress is produced by means of the control member 11.

The engaging piece 1 is initially fastened to the diaphragm 13 of the release mechanism, for example forming part of a motor-vehicle transmission. The engaging piece 1 is fastened by means or curved washer of an elastic member 14 comprising an annular bulged part 15 and a plurality of bearing lugs 16 which come in contact with one of the faces of the diaphragm 13. The engaging piece 1 itself has a substantially radial collar 17 coming up against the opposite face of the diaphragm 13 by means of a convex surface. The engaging piece 1 also has an annular sleeve 18 possessing an outer slot 19 which receives snap-in lugs 20 integral with the elastic member or curved washer 14. The engaging piece 1 is therefore fastened by elastic clamping by means of the member 14, the fingers of the diaphragm 13 being gripped between the bearing collar 17 of the engaging piece 1 and the elastic connection member 14. The axis of the engaging piece 1 is precentered relative to the axis of rotation of the diaphragm 13 by means of a mutual fit with a suitable play between, on the one hand, the bore of the fingers of the diaphragm 13 and the diameter of the sleeve 18 of the engaging piece 1 and, on the other hand, the bore of the fingers of the diaphragm 13 and a cylindrical portion 21 of the elastic member or curved washer 14.

The ball cage 3 forming an axial connection means between the engaging piece 1 and the rotating inner raceway 6 of the thrust bearing 2 is preferably made of plastic having a certain elasticity. It has a plurality of receptacles 22 for the balls 23. In the operating position, each ball 23 interacts with a retaining groove 24 made on the outer periphery of the sleeve 18 of the engaging piece 1 and, on the other hand, with a wedging cell 25 made on the inner periphery of an axial extension of the rotating inner raceway 6. The sleeve 18 of the engaging piece 1 also has, on its outer peripheral face, a release groove 18a which allows the balls 23 to move aside during removal, as will be seen.

Figure 2:
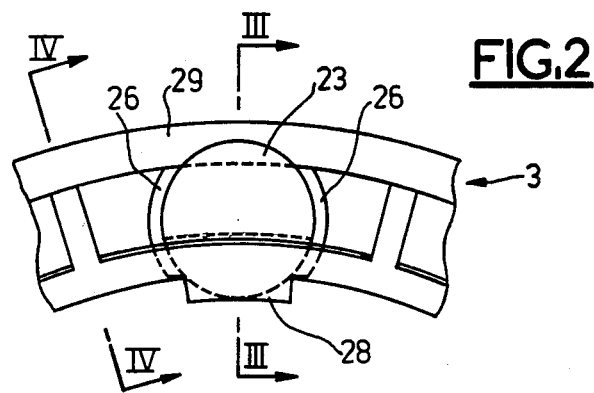
FIG. 2 is a partial side view of the ball cage of the device illustrated in FIG. 1.
Figure 3:
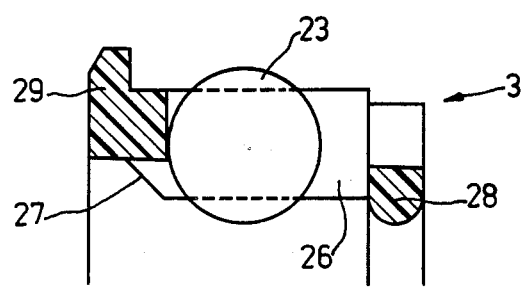
FIGS. 3 and 4 are partial sectional views along the lines III—III and IV—IV of FIG. 2.
Figure 4:
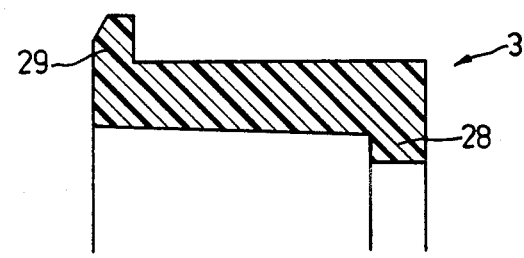

Referring to FIGS. 2 to 4, it can be seen that the receptacles 22 of the ball cage 3 have axial dimensions greater than the diameter of the balls 23, thus allowing the latter to move axially within the cage 3. Each receptacle 22 of the ball cage 3 has two elastic retaining lugs 26 which grip the balls 23 on each side over the entire axial length of the receptacle 22, thus ensuring that the balls 23 are retained by means of wedging. However, the latter can move radially in their receptacle 22 as a result of the elasticity of the retaining lugs 26. In the normal position of the balls 23, illustrated in FIGS. 2 and 3, the original diameter of the ring of balls 23 of the cage 3 is calculated to coincide with the original operating diameter of the ring of balls after engagement and under axial prestress, as illustrated in FIG. 1.

To make assembly easier and ensure precentering of the ball cage 3 during this operation, the elastic lugs 26 have a chamfered zone 27.

The ball cage 3 also has several peripheral beads 28 capable of performing a function of axial blocking of the cage in interaction with the retaining groove 24 of the engaging piece 1 during removal. A bearing rim 29 located opposite the beads 28 interacts with the end of the inner raceway 6 of the thrust bearing 2.

It is appropriate to note that, before assembly, the ball cage 3 is mounted inside the inner raceway 6 which forms a supporting piece. The ball cage mounted in this way in its supporting piece remains integral with the latter, whilst, at the same time, preserving the possibility of axial movement limited, on the one hand, by the axial bearing rim 29 and, on the other hand, as a result of the contact between the balls 23 and the cell 25.

With reference to FIGS. 5 to 7 which show diagrammatically one of the balls 23, the ball cage 3 having been omitted to make the explanations clearer, it will be seen that the ball 23 is wedged by means of the wedging cell 25 produced in the inner raceway 6 by machining without the removal of chips. The wedging cell 25 has, in a radial plane, a cylindrical profile with a radius of curvature greater than that of the ball 23 as can be seen in FIG. 6. Under these conditions, the ball 23 interacting with the wedging cell 25 likewise ensures a connection between the engaging piece 1 and the rotating inner raceway 6 in the direction of rotation, for example in the direction of the arrow F2 in FIG. 6. In an axial plane, as can be seen in FIG. 5, the wedging cell 25 has approximately the dimensions of the diameter of the ball 23, with a spherical end portion 25a which ensures that the ball 23 is wedged between the said portion 25a and the retaining groove 24 of annular profile.

It thus emerges that, at a whole, the balls 23 of the ball cage 3, because of the wedging cells 25, are capable of ensuring a connection between the engaging piece 1 and the thrust bearing 2 both in the axial direction and in rotation.

A second release cell 30 obtained by machining without the removal of chips, for example by stamping, is also made on the inner periphery of the inner raceway 6. This cell 30 has, radially, dimensions greater than those of the cell 25, so that the balls 23, when they penetrate into the cell 30, can be released from the retaining groove 24. The cell 30 opens into the cell 25, as can be seen in FIG. 7.

The operation of installing "blind" a clutch bearing device such as that illustrated in FIG. 1 will now be described with reference to FIGS. 8a to 8d. In these diagrammatic figures, identical components bear the same references as in the preceding figures. As this can be seen in FIG. 8a, the ball cage 3 is initially mounted in the bore of the inner raceway 6 of the thrust bearing 2, which is not shown in its entirety to simplify the drawings. In this initial position, the engaging piece 1 is integral with the diaphragm 13 which is gripped by means of the elastic member 14. The axial movement of the assembly consisting of the thrust bearing 2 and the ball cage 3 is obtained by manoeuvering the thrust bearing 2 towards the diaphragm 13 as a result of the action of the control member 11 visible in FIG. 1. The chamfers 27 of the elastic lugs 26 make it possible to ensure precentering when they come in contact with the likewise chamfered end 31 of the sleeve 18 of the engaging piece 1.

In the following position illustrated in FIG. 8b, the balls 23 which have come in contact with the chamfered slope 31 move aside radially by positioning themselves in the release cell 30, this movement of the balls 23 being made possible as a result of the elasticity of the lugs 26 which continue to retain the balls 23. In this position, it will be seen that the balls 23 are in contact with the locking beads 28 which limit their movement within the receptacles 22 of the ball cage 3. The latter is driven axially by means of the inner raceway 6 because of the presence of the axial bearing rim 29.

The axial shifting movement of the thrust bearing 2 is continued to the position illustrated in FIG. 8c, where the operator notices a hard point. In fact, in this position, the radial bent portion 7b of the outer raceway 7 of the thrust bearing 2 comes in contact with the bulged portion 15 of the elastic member 14. When this hard point has been reached, the operator exerts an axial pull on the thrust bearing by means of its control member 11, moving it away from the diaphragm 13. It will be seen that, in the extreme position illustrated in FIG. 8c, the balls 23 have not yet penetrated into the wedging cells 25 and remain in contact with the outer peripheral surface of the sleeve 18, without being able to penetrate into the release groove 18a.

Continuing to exert the axial pull finally brings the device as a whole into the position illustrated in FIG. 8d which is also the final position illustrated in FIG. 1, in which the balls 23 are wedged between the wedging cell 25 and the retaining groove 24. Application of the axial preload in the clutch release direction, that is to say in the direction of the arrow $F_1$ in FIG. 1, maintains the balls 23 in this final operating position.

FIGS. 9a to 9d illustrate the operations making it possible to remove the clutch bearing device, this removal being carried out "blind", in the same way as the fitting just described.

The operator first exerts an axial push on the thrust bearing 2, acting by means of its control member 11 so as to bring the thrust bearing 2 closer to the diaphragm 13, until the hard point corresponding to the contact between the portion 7b of the outer raceway 7 and the bulged part 15 appears. This position, illustrated in FIG. 9a, corresponds to that illustrated in FIG. 8c.

The operator continues his action by passing beyond this hard point, thus causing elastic deformation of the member or curved washer 14, as illustrated in FIG. 9b. In this movement, the locking beads 28 of the ball cage 3 a pass over the extreme edge of the retaining groove 24 as a result of the elasticity characteristics of the cage 3. The locking beads 28 interact with the retaining groove 24. The balls 23 have left the retaining groove 24 and can move aside into the release groove 18a. Moreover, they are located opposite the release cell 30.

The operator can then exert an axial pull again on the thrust bearing 2 illustrated in FIG. 9c. The ball cage 3 remains blocked on the engaging piece 1 as a result of the action of the axial locking beads 28 which interact with the retaining groove 24. The balls 23, by moving aside into the release groove 18a, allow the end part of the inner raceway 6 to pass beyond the wedging cell 25.

The pull continues to be exerted, as illustrated in FIG. 9d where the thrust bearing 2 is finally completely disconnected from the ball cage 3 which remains seated round the sleeve 18 of the engaging piece 1 fastened to the diaphragm 13.

The embodiment illustrated in FIG. 10 differs from the embodiment illustrated in FIG. 1 in that the ball cage is initially accommodated in the bore of the engaging piece, and by means of axial locking of the ball cage.

Identical components in this figure bear the same references. The thrust bearing 32 differs from the thrust bearing 2 in that its rotating inner raceway 33 has an extension 34 in the form of an axial sleeve, the outer periphery of which has the retaining groove 35 which performs the same function as retaining groove 24 of the embodiment illustrated in FIG. 1.

The engaging piece 36 differs from the engaging piece 1 in that its inner periphery has a wedging cell 37 and a release cell 38 which are produced by machining, without the removal of chips, in an axial sleeve 39 extending the bearing collar 40 of the engaging piece 36. The cells 37 and 38 have the same structure and the same function as the cells 25 and 30 of the preceding embodiment.

The ball cage 41 has a structure similar to that of ball cage 3. It likewise has receptacles 42 for the balls 43 with axial dimensions slightly greater than the diameter of the balls 43 and provided with elastic retaining lugs 42a which grip the balls 43 and which can be seen in FIGS. 11 and 12 and, as in the preceding case, allow an elastic radial movement of the balls 43 in their receptacle 42. The ball cage 41 also has an axial bearing rim 44 capable of interacting with an annular groove 45 made in the bore of the engaging piece 36 at the end of the axial sleeve 39. It will be seen that, in this embodiment, the end face 46, opposite the rim 44, of the ball cage 41 has no locking bead.

An axial locking piece 47 which, in FIG. 10, takes the form of a cup provided with a radial edge 48 and an axial edge 49 composed of a plurality of lugs is fastened to the end of the engaging piece 36 by means of pegs 50, each peg 50 extending one of the lugs of the edge 49. The axial locking piece 47 can also be made in the of a split washer, in which case the portion 48 is replaced by a plurality of radial lugs.

The pegs 50 of the collar 47 can interact with a first snap-in groove 51 or with a second groove 52, both made in the outer periphery of the sleeve 39 of the engaging piece 36. In the position illustrated in FIG. 10, which corresponds to the normal operating position of the clutch bearing device, the pegs 50 are accommodated in the first groove 51 near the end of the sleeve 39. In this position, because of the axial dimensions of the portion 49 of the collar 47, the portion 48 is away from the extreme front face of the sleeve 39 and thus allows axial movement of the ball cage 41. The position of the second groove 52 is such that the portion 48 is, on the contrary, in contact with the extreme front face of the sleeve 39 when the pegs 50 of the cup 47 are snapped in the said groove 52. In this position, the portion 48 of the cup 47 forces the ball cage 41, with the outer face of which it comes in contact, to shift until the bearing rim 44 is accommodated in the groove 45 of the engaging piece 36.

A stop piece 53 of L-shaped cross-section is also fitted on the outer periphery of the sleeve 34 of the inner raceway 33 of the bearing 32. The stop piece 53 comprises an axial portion 54 allowing it to be fitted round the sleeve 34 and a radial portion 55 which is capable of coming in contact with the portion 48 of the locking cup 47, so as to define a hard point during assembly.

The clutch bearing device illustrated in FIG. 10 is completed by an elastic member 56 which bears, on one side, on one of the faces of the diaphragm 13 and, on the other side, on the end edge of the bearing cup 40 of the engaging piece 36. The elastic member 56 thus ensures that the engaging piece 36 is secured elastically in contact with the diaphragm 13 by gripping.

Reference will now be made to FIGS. 11a to 11d which illustrate the operation of installing "blind" the clutch bearing device illustrated in FIG. 10.

As can be seen in FIG. 11a, the ball cage 41 is initially mounted in the bore of the engaging piece 36 which is integral with the diaphragm 13 by means of the elastic member 56. The axial movement of the thrust bearing 2 in the direction of the diaphragm 13 under the action of the control member 11, visible in FIG. 10, is illustrated in FIG. 11a. As before, the chamfers 42b of the elastic lugs 42a retaining the balls 43 ensure precentering when they come in contact with the likewise chamfered end of the sleeve 34 of the inner raceway 33. The balls 43 also come in contact with this chamfered portion. They can move radially outwards towards the release cell 38.

The continuation of this pushing movement on the thrust bearing 32 is illustrated in FIG. 11b, where it can be seen that the balls 43 roll on the end of the sleeve 34, remaining in the cell 38. It will also be noted that, during these operations, the ball cage 41 is kept locked axially relative to the engaging piece 36 by means of its bearing edge 44 which is located in the groove 45. The axial locking piece 47 is in its first position, in which the pegs 50 interact with the first groove 51, thus allowing the ball cage 41 freedom of axial movement.

FIG. 11c illustrates the following position, in which the balls 43 have penetrated into the retaining groove 35 under the action of their elastic retaining Lugs. The operator notices a hard point as a result of the contact between the collar 47 and the stop piece 53. The operator thus realizes that the assembly of the clutch bearing device is completed. He then exerts a pull on the thrust bearing 32 and puts the latter under prestress, the assembly as a whole then assuming the configuration illustrated in FIG. 11d which is identical to that of FIG. 10. This pulling movement exerted on the thrust bearing 32 caused a shift of the ball cage, the balls 43 of which were blocked by the retaining groove 35. During their movement together with the thrust bearing 32, the balls 43 interacted with the wedging cells 37. The ball cage 41 shifted axially, its end face coming into contact with the cup 47, and the rim 44 leaving the groove 45.

FIGS. 12a to 12d illustrate the operations making it possible to remove the clutch bearing device "blind".

The operator first exerts an axial push on the thrust bearing 32 by acting on its control member 11 so as to bring the thrust bearing 32 closer to the diaphragm 13, until the hard point corresponding to contact between the stop piece 53 and the collar 47 appears. The operator continues his action beyond this hard point, thus causing the elastic deformation of the lugs of the edge 49 of the piece 47, the pegs 50 of which escape from the groove 51 to the extent that they snap into the second groove 52. The transfer from the first groove 51 to the second groove 52 is illustrated in FIG. 12a. It will also be seen in this figure that the push on the thrust bearing 32 drives the balls 43 and the ball cage 41 because of the retaining groove 35, the bearing rim 44 progressively penetrating into the groove 45.

The final position in the pushing action is illustrated in FIG. 12b, where it will be seen that the pegs 50 have penetrated into the second groove 52, whilst the rim 44 is inserted completely into the groove 45. The balls 43, still retained in the retaining groove 35, are consequently located opposite the release cell 38.

The operator, detecting that it is impossible to continue the pushing movement, then exerts a pull on the thrust bearing 32 exceeding the latter, as illustrated in FIG. 12c. The balls 43 can move radially outwards into the release cell 38, rolling on the outer periphery of the sleeve 34, whilst remaining retained elastically in the lugs 42a. The ball cage 41 is maintained locked axially on the engaging piece 36 by means of the cup 47.

FIG. 12d illustrates the final position, in which the thrust bearing 32 has been removed completely. The ball cage 41 remains seated in the bore of the engaging piece 36 fastened to the diaphragm 13.

The embodiment illustrated in FIG. 13 differs from the embodiment illustrated in FIG. 10 only in the structure of the elastic locking member of the engaging piece 36. In this figure, identical components bear the same references as in the preceding figures. In this embodiment, the elastic retaining member 57 is a curved washer with elastic corrugations, having attaching lugs 58 which pass between the fingers of the diaphragm 13 in order to grip the engaging piece 36. The washer 57 also has snap-in lugs 59 which can interact with the first groove 51 or with the second groove 52, as was the case regarding the cup 47 of the embodiment of FIG. 10. The washer 57 is extended by a member 60 consisting of a plurality of lugs, each provided with a radial portion 61 and an axial portion 62 and performing, by means of the radial portions 61, the same function of axial locking of the ball cage as the piece 47 illustrated in FIG. 10.

As has been seen, the clutch bearing device according to the invention makes it possible to carry out the fitting and removal of the thrust bearing in a simple way and "blind". Moreover, the device of the invention has very high operating safety because of a snap-in mechanism with balls. Such a device requires only a very slight axial snapping-in force. The appearance of a hard point during installation accurately marks the stop of the engaging operation. Finally, the structure of the snap-in device with balls eliminates any risk of jamming during the fitting and removal operations.

We claim:

1. A traction-type clutch thrust bearing device adapted for mounting to a clutch diaphragm over an axial guide tube, said device comprising:
   an engaging assembly having an engaging piece and including elastic means for connecting said assembly to the diaphragm; said engaging piece having an end, and inner periphery, and an outer periphery;
   a thrust bearing assembly adapted to reciprocally slide on the guide tube;
   one of said assemblies having a wedging surface and another one of said assemblies having a retaining groove therein defining a wedging zone;
   one of said assemblies having a release groove defining a release zone;
   connecting means for releasably locking said assemblies together, said connecting means comprising a plurality of balls, and a ball retaining element positionable between said assemblies for retaining said balls;
   said balls, said wedging surface and said retaining groove cooperating to releasably lock said assemblies together;
   each of said balls being movable to a locking position in response to movement of said thrust bearing assembly in a first axial direction toward said engaging assembly and then in a second direction opposite to said first direction;
   each of said balls when in its locking posiiton lying in said retaining groove and engaging said wedging surface to lock said assemblies together;
   said release groove being positioned to receive said balls when said thrust bearing assembly is moved further in said first direction;
   said balls when in said release zone being radially displaced from the wedging surface to unlock said connecting means so that said thrust bearing assembly is movable in said second direction to disconnect it from said engaging assembly.

2. A clutch thrust bearing device, as claimed in claim 1, wherein said ball retaining element comprises a ball cage, said ball cage having a plurality of receptacles for said balls, each of said receptacles having axial dimensions greater than the diameter of said balls.

3. A clutch thrust bearing device as claimed in claim 2, wherein each of said receptacles has two elastic retaining lug means for holding said balls in a circular array which corresponds to positions occupied by said balls when they are in their locking position.

4. A clutch thrust bearing device as claimed in claim 1, further comprising means for axially blocking said ball cage during disconnection of said assemblies.

5. A clutch thrust bearing device as claimed in claim 1, wherein said ball cage has a chamfered peripheral portion providing means for precentering said ball cage.

6. A clutch bearing device as claimed in claim 1, wherein each wedging surface has a first wedging cell with a radius of curvature in a radial plane that is greater than that of said balls in said ball cage, said release groove having a second release cell opening into said first cell and having a cavity greater than said first cell.

7. A clutch thrust bearing device as claimed in claim 1, further comprising elastic axial stop means, said stop means limiting the relative axial movement of said thrust bearing assembly and said engaging assembly during connection thereof.

8. A clutch thrust bearing device as claimed in claim 1, wherein said thrust bearing assembly has an inner raceway with an inner periphery, said wedging surface and said release groove being located on the inner periphery of a portion of said inner raceway, said retaining groove being located in the outer periphery of said engaging assembly.

9. A clutch thrust bearing device as claimed in claim 8, wherein said release groove is located on the outer periphery of said engaging assembly.

10. A clutch thrust bearing device as claimed in claim 8, wherein said ball cage comprises at least one peripheral bead adapted to be received by said retaining groove during disconnection of said assemblies, said at least one bead blocking said cage when receivd by said retaining groove.

11. A clutch thrust bearing device as claimed in claim 8, wherein said ball cage further comprises an axial bearing rim riding on said inner raceway of said thrust bearing assembly.

12. A clutch trust bearing device as claimed in claim 1, wherein said elastic means comprises a curved washer providing an axial stop for limiting the axial movement of said thrust bearing assembly during connection of said assemblies, said curved washer compressing to permit disconnection of said assemblies when said release zone receives said balls.

13. A clutch thrust bearing device as claimed in claim 8, wherein said inner raceway has a bore, said wedging zone and said release zone being located on said bore, said bore accommodating said ball cage.

14. A clutch thrust bearing device according to claim 1 further comprising control means for reciprocally moving said thrust bearing assembly on the guide tube.

15. Clutch thrust bearing device according to claim 1, wherein the clutch thrust bearing has an inner raceway with an outer periphery, characterized in that the wedging and release zones are made on the inner periphery of the engaging piece, the retaining groove being made in the outer periphery of part of the inner raceway of the thrust bearing assembly.

16. Clutch thrust bearing device according to claim 15, characterized in that the ball cage has an axial bearing rim interacting with the end of the engaging piece.

17. Clutch thrust bearing device according to claim 15, characterized in that it has an axial locking piece for the ball cage, which is fastened to the end of the engaging piece so that it can occupy two axial positions, namely a first position, in which the balls can move to said locking position, and a second position, in which the balls of the ball cage interact with their release zone (38).

18. Clutch thrust bearing device according to claim 17, characterized in that the axial locking piece of the ball cage is fastened to the engaging piece (36) by being snapped in elastically and can pass from the first position to the second position as a result of an axial push.

19. Clutch thrust bearing device according to claim 17 or 18, characterized in that the elastic retaining means of the engaging piece comprise a curved washer provided with a plurality of lugs defining the said axial locking piece of the ball cage.

20. Assembly making it possible to produce a clutch thrust bearing device according to claim 15, characterized in that it comprises an engaging piece, having on its bore a wedging zone and a release zone, and a ball cage accommodated in the bore of the engaging piece.

* * * * *